(12) United States Patent
Yetzke

(10) Patent No.: US 6,234,909 B1
(45) Date of Patent: May 22, 2001

(54) ENGINE COMPENSATOR

(75) Inventor: Steve Yetzke, Yorba Linda, CA (US)

(73) Assignee: Belt Drives, LTD, Orange, CA (US)

( * ) Notice: Subject to any disclaimer, the term of this patent is extended or adjusted under 35 U.S.C. 154(b) by 0 days.

(21) Appl. No.: 09/373,917

(22) Filed: Aug. 12, 1999

(51) Int. Cl.[7] .................................................. F16D 3/12
(52) U.S. Cl. ........................................... 464/180; 464/49
(58) Field of Search ............................. 464/49, 109, 147, 464/89, 73, 75, 92, 98, 150, 151, 180, 185, 54; 74/574, 411; 192/206; 403/359; 983/408.1

(56) References Cited

U.S. PATENT DOCUMENTS

| | | | |
|---|---|---|---|
| 2,370,649 | * | 3/1945 | Gerald ................................... 464/54 |
| 3,257,860 | * | 6/1966 | Runde et al. .......................... 474/94 |
| 3,991,818 | * | 11/1976 | Wagner ................................. 74/243 |
| 4,182,194 | * | 1/1980 | Tomozawa .......................... 192/6 R |
| 4,446,955 | * | 5/1984 | Lech, Jr. ............................... 464/68 |
| 5,379,660 | * | 1/1995 | Ishikawa ............................. 464/180 |

\* cited by examiner

Primary Examiner—Terry Lee Melius
Assistant Examiner—Kenn Thompson
(74) Attorney, Agent, or Firm—Bruce A. Jagger

(57) ABSTRACT

An improved springless engine compensator comprising a first load bearing flange, a compensator bushing member, an output ring member threadably mounted on the compensator bushing member, a second load bearing flange. The flanges and the compensator bushing are fixedly mounted to an input shaft. The output ring member is mounted between the flanges for limited axial and rotational movement relative to the input shaft. The compensator absorbs rotational shock loads while transferring rotational loads from an input shaft to the output ring member. Compensating rotation is easily and precisely adjustable with the use of shims. Uniquely, the output ring member simultaneously compensatingly rotates and moves; axially on the compensator bushing member, and is captively restrained by the bearing flanges. Buffer members can be provided if desired between the mating faces of the flanges and the output ring member. The thickness of the impact absorbing buffer members can be varied so as to adjust the amount of the axial movement of the output ring member.

21 Claims, 5 Drawing Sheets

ENGINE COMPENSATOR

BACKGROUND OF THE INVENTION

1. Field of the Invention

The invention relates in general to engine compensators and, in particular, to an improved engine compensator capable of repeatedly and reliably absorbing the high rotational shock loads delivered through a drive train by high performance engines. Compared to conventional compensators, the compensator of the present invention comprises fewer parts, weighs less, is less expensive to manufacture, and uniquely provides simultaneous compensating rotation and axial movement of the compensator output ring member.

2. Description of the Prior Art

An engine compensator is a mechanism that transmits rotational loads between an input shaft and an output ring member while also providing compensating rotation of the output ring member relative to an input shaft. Typically, the input shaft is the crankshaft of an engine. This compensating rotation, or "give", is often needed in order to absorb rotational shock loads. In many industries, compensators are desired for their ability to provide smooth power delivery. Compensators are often required to reliably protect transmission gears, sprockets, chains and other drive train elements from failure due to spike loads delivered to the drive train system. This type of failure is of particular concern in the motorcycle industry where large spike loads from the engine are delivered to the drive train during shifting, accelerating, and decelerating. These spike loads are particularly severe in racing conditions where, as often times occurs, the clutch is abused during shifting. This abuse occurs when the clutch is rapidly re-engaged when the engine RPM is significantly greater than the input RPM desired by the drive train or system. The same abuse occurs during deceleration, that is, when the engine RPM is significantly less than the input RPM desired by the drive system when the clutch is rapidly re-engaged.

Approximately during the 1930's the manufacturer of Harley-Davidson Motorcycles developed a highly successful engine compensator which to this day has essentially remained unchanged. The compensator weighs approximately 6 lbs ⅛ oz and was originally designed for V-twin four stroke engines of around 750 to 880 cubic centimeter capacity. These engines initially produced approximately 38 to 40 horsepower. The prior art compensator for these engines comprises a plurality of components, and the compensating action of the mechanism is achieved by the use of belleville springs that are configured to absorb the rotational spike loads. The prior art compensator functions satisfactorily as long as spike loads remain less than about 130 ft-lbs, which is generally the case for 38 to 40 horsepower engines.

Many disadvantages of the prior art compensators become apparent when they are used in drive trains where the horsepower of the engine substantially exceeds 40 horsepower. Today it has become commonplace to modify, for example, motorcycle engines to achieve power ratings of 100 horsepower or greater. As the horsepower increases, so do the rotational spike loads imposed on the components of the drive system. Under high performance conditions, these spike loads can easily exceed 130 ft-lbs. The prior art compensator is unable to consistently and reliably absorb these increased rotational shock loads. The belleville springs in the prior art compensator often break, causing the compensator to slip. When the compensator slips, rotational loads can no longer be transmitted through the mechanism. Attempts have been made to add additional belleville spring washers to the prior art compensator to correct this problem, however the rotational shock loads of these high performance engines still cause spring failure. A common, but undesirable, solution often employed by users to overcome this problem is to weld the compensator mechanism solid. This not only eliminates the desirable compensating action of the mechanism, but also reduces the mechanism to the role of adding additional weight and rotational inertia to the engine. This unnecessary weight and inertia is highly undesirable in high performance applications.

Prior engine compensators that were proposed for use with high performance motorcycle engines generally could not consistently and reliably absorb rotational shock loads in excess of approximately 130 ft-lbs.

Thus, those concerned with these problems recognize the need for an improved engine compensator capable of consistently and reliably absorbing the increased rotational shock loads that are associated with high performance engines. Those skilled in the art also recognize the need for such a compensator to comprise as few parts as possible, be simple to manufacture, be lightweight, and add as little rotational inertia to the drive train as possible.

These and other difficulties of the prior art have been overcome according to the present invention.

BRIEF SUMMARY OF THE INVENTION

It is one object of the present invention to provide an improved engine compensator capable of consistently and reliably absorbing large rotational shock loads that are associated with high performance engines.

It is another object of the present invention to provide an improved engine compensator that does not utilize mechanical springs that can fatigue and break.

It is yet another object of the present invention to provide an inexpensive engine compensator comprising few parts, and that is lightweight and adds a minimal amount of rotational inertia to the system.

It is yet another object of the present invention to provide an axially moveable motorcycle engine compensator that is capable of consistently and reliably absorbing rotational shock loads of at least 130 ft-lbs.

It is yet another object of the present invention to provide an infinitely adjustable engine compensator to satisfy the requirements of any individual application, as desired.

Compensator devices according to the present invention generally comprise an input shaft having a longitudinal axis and two stop members fixedly associated with the input shaft to define a space therebetween. The stop members are spaced apart generally along the longitudinal axis of the input shaft. An external thread is provided between the stop members in generally fixed concentric association with the input shaft. The external thread can be on the input shaft itself or on an initially separate member that is fixedly mounted to the input shaft. Generally, an externally threaded compensator bushing member is fixedly mounted to the input shaft between the two stop members. The externally threaded compensator bushing member is mounted so that it is fixed to and rotates generally concentrically with the shaft. An internally threaded output ring member is threadably mounted on the externally threaded bushing member for threadable movement in an axial direction between the two stop members. The stop members limit the threadable axial movement of the output ring member along the input shaft. The stop members thus receive and must resist substantial axially directed loads that are transmitted to them by the output ring member. The output ring member is thinner than the distance between the two stop members. The pitch of the thread and the thickness of the output ring member are generally such that the compensator bushing member can make at least approximately one degree, and preferably at least approximately 10 to 20 degrees of revolution, or more, as the output ring member travels between the stop members. The axial distance that the output ring member is permitted to travel between the two stop members is preferably adjustable so as to accommodate individual applications. The axial travel can range from approximately one thirty second or less to one quarter or more inches. Preferably, the axial travel is from about one sixteenth to one eighth inches. The amount of axial travel is determined in large part by the pitch of the thread. In general, the axial travel should not be so great as to stress the components that are operatively associated with the output ring member. For example, in motorcycle applications a drive chain is usually trained over the output ring member. If the chain reach is short, for example 1 foot, it can tolerate less axial movement than if it is long, for example, 2 feet. The diameter of the output ring member at all angles of rotation preferably extends generally normal to the longitudinal axis of the input shaft and the output ring member is generally mounted so that it is generally concentric with this longitudinal axis.

The output ring member preferably includes faces on either axial side that are configured to engage the stop members either directly or though buffer members. For ease of manufacturing such faces are generally planar and extend substantially normal to the longitudinal axis of the input shaft. Other facial configurations such as conical, arcuate, or the like, can be employed, if desired. The mating surfaces of the stop members are configured accordingly to accommodate the faces of the output ring member or buffer members, if present.

When the output ring member engages the stop members substantial shock loads are generated, and there is a possibility of some bounce back. Also, there is a risk that the metal-to-metal engagement of the respective mating surfaces may result in some impact welding. Buffer members are preferably positioned between the faces of the output ring member and the mating surfaces of the stop members so as to absorb or dampen the shock of the engagement between the output ring member and the stop members, and to prevent any tendency of the metal faces to impact weld to one another. The buffer members can be mounted to one or the other of the output ring member or the stop members or both, or they can be free standing and not mounted to either. The buffer members are typically capable of absorbing shock but are preferably not resilient in the sense of being springy. In general the buffer members are preferably composed of some material that is "lossey" in the sense that it absorbs shock and does not transmit it well, while simultaneously transmitting loads. A steel hammer striking a block of steel will bounce, but the same hammer striking a block of lead with equal force will not. The block of steel is resilient while the block of lead is "lossey". It absorbs or dampens rather than transmits shock. For example, generally rigid polymeric materials such as engineering plastics are suitable for use as buffer members, provided they are not damaged by oil and the elevated temperatures that are generally encountered during use. Springy materials and configurations are less desirable because they tend to bounce back from the application of a shock load resulting in some oscillation of the compensator device.

Typically, the output ring member is provided with power transmission elements, usually on its radially outer periphery. Such power transmission elements include, for example, sprocket teeth for engaging a drive chain, gear teeth for engaging toothed belts or other gears, frictional engaging elements, or the like.

The stop members are fixed to the input shaft in the axial direction, but not necessarily in the rotational direction. If desired, the engaging surfaces of the stop members can be journaled to the input shaft so as to rotate about the longitudinal axis. This can help absorb the shock loads and compensate for wear.

In a preferred embodiment of the improved compensator according to the present invention the first stop member comprises a first load bearing flange, and the second stop member comprises a second load bearing flange. The flanges extend generally radially from, and are fixed to and rotate with the input shaft. The output ring member includes opposed generally annular faces that extend substantially normal to and concentric with the longitudinal axis of the input shaft. The first and second load bearing flanges including mating generally annular flanges which are adapted to engage face to face with the mating faces on the respective load bearing flanges, preferably through buffer members. The assembly is held in place on the input shaft, for example, by a mounting nut that compresses the components together.

The compensator assembly is mounted on an input shaft that is typically the crankshaft of a motorcycle engine, and it is adapted to absorb shock loads and transmit rotational loads between the input shaft and the output ring member. The output ring member operably engages the compensator bushing member so as to compensatingly rotate and move axially relative to the input shaft. The opposed sides of the output ring member include opposed load transferring ends that are adapted to engage the load bearing flanges so that rotational loads are transferred between the input shaft and the output ring member. The output ring member cannot move axially unless, at the same time, it also rotates relative to the input shaft because of the threadable engagement between the output ring member and compensator bushing member. External helix threads, for example, are provided on the compensator bushing member, and mating internal helix threads are provided on the output ring member. Other helix type configurations, other than threads, may be used, if desired. Double threads can be used, if desired. The compensator bushing member has opposed bushing ends. Adjacent each bushing end is a load bearing flange. A shoulder, for example, is provided on the input shaft near one bushing end and the input shaft adjacent the other bushing end is threaded to accept a mount nut. The shoulder prevents the first load bearing flange from moving axially away from the threaded end. Spacers can be provided. if desired, between the bushing ends and the respective load bearing flanges. When the mount nut is properly tightened on the input shaft, the load bearing flanges and compensator bushing member are captured and compressively engaged against one another, directly or through spacers, on the shaft between the shoulder and mount nut.

The width of the compensator bushing member is greater than the width of the output ring member. This allows for free compensating rotation and axial movement of the output ring member between the load bearing flanges. The load bearing flanges captively limit both the compensating rotation and axial movement of the output ring member. Opposed load transferring ends of the output ring member, which, when engaged with either load bearing flange, allows transfer of rotational loads from the input shaft to the output ring member. This free compensating rotation provides desirable "give" in the drive system. The precise amount of "give" can be finely adjusted, as desired, by simply stacking any number of adjustment shims (within the range permitted by the need to maintain threaded engagement) between the opposed bushing ends and an adjacent load bearing flange. This allows the drive system to be adjusted to satisfy the shifting requirements and feel of any individual application, as desired.

Buffer members made, for example, of nylon, and positioned between the faces of the output ring member and the mating faces of the flanges, provide satisfactory results in damping shock and preventing any tendency of the metal faces to weld to one another. Other lossey materials can be used, as desired. The buffer members, having a thickness of at least about 0.020 inches, and preferably at least about 0.050 inches, are mounted between the mating faces of the load bearing flanges and the output ring member.

Uniquely, the output ring member of the compensator of the present invention moves axially along the input shaft when it compensatingly rotates between the captive load bearing flanges. Allowing such axial motion of a gear or sprocket carrying a chain is generally unconventional in the art.

Advantageously, there are no springs in the present invention engine compensator. One embodiment of the unique axially moving engine compensator for use in a high performance motorcycle weighs just 3 lbs ⅜ oz and replaces the prior art spring compensator weighing 6 lbs ⅛ oz. This is a substantial weight reduction and, with the elimination of unnecessary parts and lower profile, the rotational inertia of the compensator is also substantially reduced. Minimizing the overall rotational inertia of the drive train system is very desirable, particularly in high performance applications, but also where energy savings are desired.

The axially moving compensator according to the present invention is capable of consistently and reliably absorbing rotational shock loads of approximately 130 ft-lbs and greater, such as arise from high performance engines producing power 50 to 100 horsepower or greater. Such capacity to consistently and reliably absorb loads was generally unobtainable with prior art compensators.

Other objects, advantages, and novel features of the present inventing will become apparent from the following detailed description of the invention when considered in conjunction with the accompanying drawings.

BRIEF DESCRIPTION OF THE DRAWINGS

The present invention provides its benefits across a broad spectrum of compensators for rotational powered drive systems. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation.

DETAILED DESCRIPTION OF THE PREFERRED EMBODIMENTS

Figure 1:
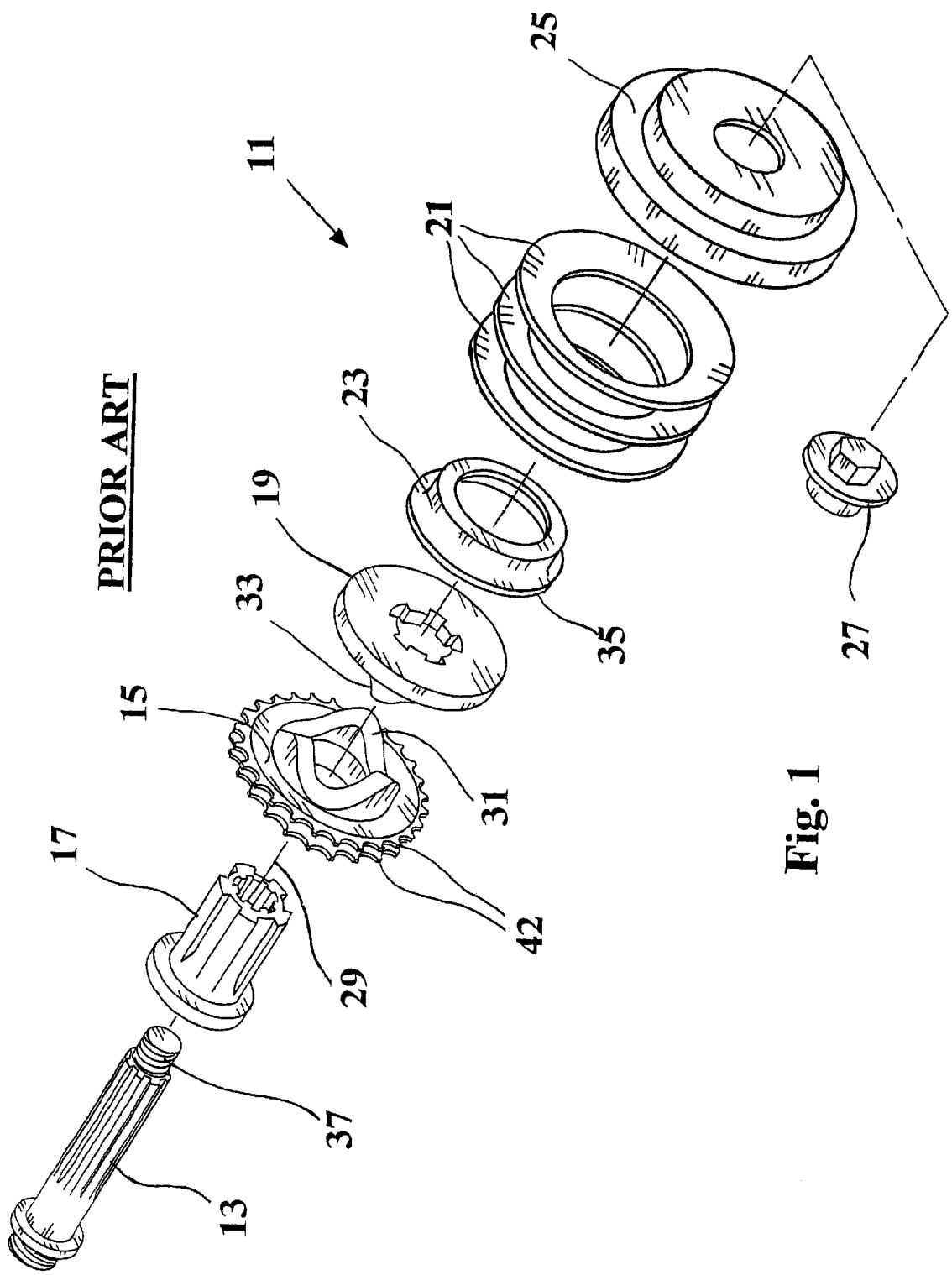
FIG. 1 is an exploded perspective view of a prior art engine compensator.

In FIG. 1 generally shown at 11 is a prior art engine compensator adapted for use with engines rated at no more than about 40 horsepower at most. Power is delivered to input shaft 13 by an engine (not shown). The compensator transmits rotational loads between input shaft 13 and output gear 15. A chain, not shown, transfers the rotational load from output gear 15 to a conventional drive train or transmission (not shown). The prior art engine compensator 11 comprises a double splined (both internal and external splines) collar 17, an engager 19, three belleville springs 21, a spring retainer 23, a housing 25, and a mount nut 27. Double splined collar 17 engages input shaft 13 in a load transferring relationship. As used herein, a load transferring relationship is a relationship where rotational loads delivered to one member are passed on to another member. For example, a member fixedly attached to a shaft is in a load transferring relationship with that shaft. A gear slidably engaging splines on a shaft establishes a load transferring relationship even though the gear can move axially on the shaft.

Output gear 15 rotably engages splined collar 17 and with the other components removed, the output gear freely rotates on the splined collar about longitudinal axis 29. The output gear 15 has a concentric wave flange surface 31 which loosely intermeshes with a mating concentric wave flange surface 33 on engager 19. Engager 19, when assembled, is in a load transferring relationship with splined collar 17 and thus turns with the input shaft 13. Spring retainer 23 has an outward flange 35, which, when assembled, is biased against engager 19 by the belleville spring washers 21. The belleville spring washers are biased against both the housing 25 and spring retainer 23. Mount nut 27 threadably engages end 37 of input shaft 13 biasing the housing 25 against the spring washers 21. When assembled, the engager is biased against the output gear and there is intentionally about 10 degrees of free rotation of the output gear with respect to the input shaft. This free rotation occurs because of a loose engagement of the mating wave surfaces of the output gear and engager. This free rotation is a desirable feature because it provides "slack" in the drive train. Most all clutches, particularly oil bathed clutches found in motorcycle applications, inherently "drag" when engaged. This "drag" applies a slight bias to the drive system, and in order to overcome this "drag," additional effort is required when shifting gears. However, providing free "slack" in the compensator alleviates the effects of the "drag" induced bias, and significantly improves shifting.

The prior art engine compensator in FIG. 1, when adapted for use with engines rated at a maximum of about 40 horsepower, is made of steel and weighs approximately 6 lbs ⅛ oz (excluding the input shaft). This compensator suffers many disadvantages. The mechanism is undesirably complex as the number of parts are excessive (9 as shown in FIG. 1). The parts are also expensive to make. In addition, the compensator undesirably contributes a significant amount of weight and rotational inertia to the drive train, which is particularly undesirable in high performance applications.

Furthermore, the compensator fails to consistently and reliably transfer rotational loads in high performance engine applications. In particular, when repeatedly subjected to intermittent rotational shock loads of around 130 ft-lbs or more, the belleville spring washers generally fail and rotational loads are no longer transferred through the compensator to the drive train. In this condition the motorcycle becomes undesirably inoperable.

Another drawback to the prior art compensator is that the desirable "slack" in the compensator is non-adjustable. Adjustability of the "slack" is not only highly desirable in high performance applications but is also desirable to individual enthusiasts who like to customize the "feel" of their motorcycles.

Figure 2:
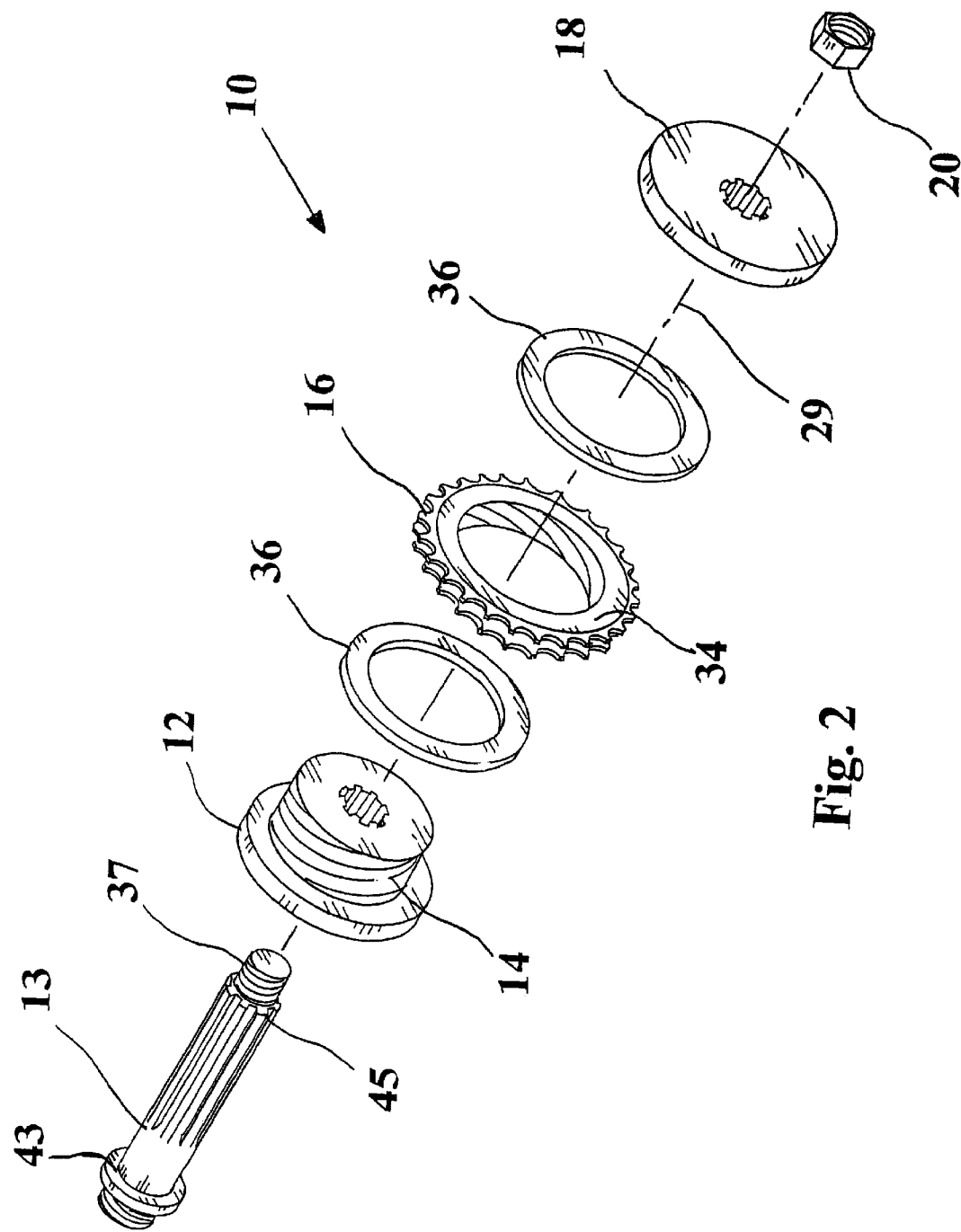
FIG. 2 is an exploded perspective view of a preferred embodiment of the invention.
Figure 3:
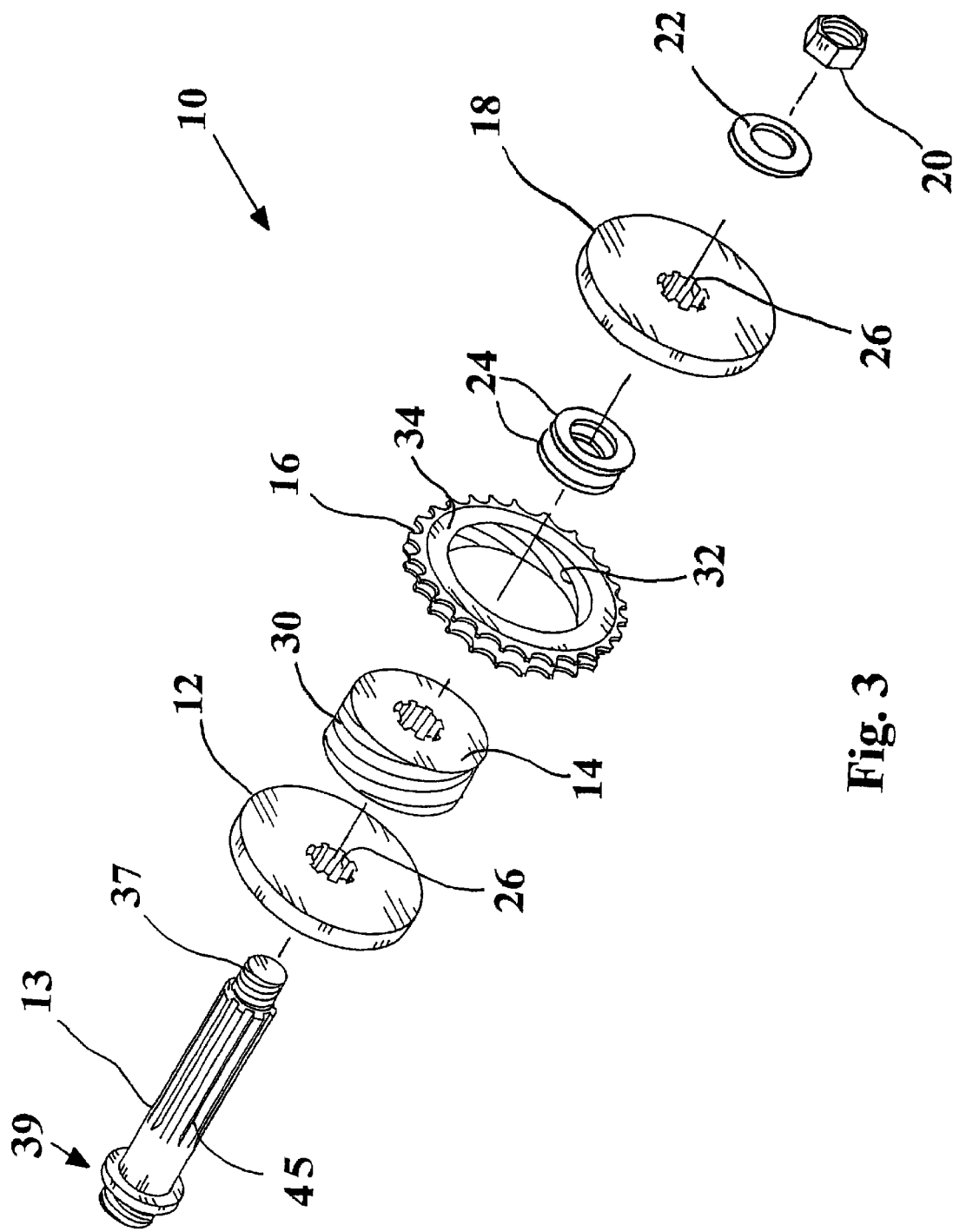
FIG. 3 is an exploded perspective view of another embodiment of the invention.

Referring now to FIGS. 2–5 wherein like reference numerals designate identical or corresponding parts throughout the several views, there is illustrated generally at 10 a high performance compensator of the present invention. In the preferred embodiments, referred to for purposes of illustration only and not limitation, the compensator 10 comprises a first load bearing flange 12, a compensator bushing member 14, an output ring member 16, a second load bearing flange 18, and a mounting nut 20. In the embodiment of FIG. 2, the flange 12 and bushing member 14 and Integral in the sense that they are one piece. In the embodiment of FIG. 3, for example, they are separate parts. Mount washer 22 and adjustment shims 24 (FIG. 3) may be included if desired, but are not required. The first load bearing flange 12 engages input shaft 13. A stop means is required to prevent the first load bearing flange from moving axially towards shaft end 39. In FIG. 3, for example, the first load bearing flange includes mating groves 26 which, when engaged on the input shaft, abut the end of groves 41 provided in the input shaft. This establishes the stop means for this embodiment. Similarly, the compensator bushing member 14, having opposed bushing ends 28 (FIG. 4), operably engages the input shaft such that one bushing end is adjacent the first load bearing flange 12. The compensator bushing member 14 is in a load transferring relationship with input shaft 13 by reason of the spline to spline engagement of these parts.

Output ring member or gear threadably 16 engages the compensator bushing member 14 so as to simultaneously compensatingly rotate and axially move about the compensator bushing member. This means that the output ring member 16 cannot move axially unless, at the same time, it is rotated realtive to shaft 13. A threadable engagement between the output ring member and the compensator bushing member is provided, for example, in the embodiments shown in FIGS. 2 through 5, by external helix screw threads 30 on the compensator bushing member, and mating internal helix screw threads 32 on output ring member 16. It is preferred that at least four complete screw threads be provided on both the compensator bushing member and output ring member, however, more or less complete screw threads can be provided, as desired, depending on the intended application and its requirements, such as horsepower output, and the like. Furthermore, many variations of helix configurations, other than what are customarily regarded as threads, may be utilized, as desired, to achieve the required simultaneous compensating rotation and axial movement of the output ring member 16 on the compensator bushing member 14. It has been found that internal and external helix threads are preferred because they are simple and easy to produce using conventional machining operations, however other configurations can be used, as desired.

With the output ring member engaged on the compensator bushing member, the second load bearing flange 18 engages the input shaft and abuts the other opposed bushing end 28, directly (FIG. 2) or through shims 24 (FIG. 3). The second load bearing flange engages the input shaft in the same manner as the first load bearing flange, and mount washer 22 and mount nut 20 are installed. With mount nut 20 securely fastened and torqued to threaded portion 37 of the input shaft, the first and second load bearing flanges and compensator bushing member are compressively engaged on the input shaft. In the illustrated embodiments these elements are axially and rotationally fixed to the input shaft. This compressive engagement has been found desirable in high performance applications.

Importantly, the width of the compensator bushing member 14 is greater than the width of the output ring member 16. This allows for free compensating rotation and axial movement of the output ring member between the load bearing flanges. The load bearing flanges captively limit both the compensating rotation and axial movement of the output ring member. Opposed load transferring faces or ends 34 (only one end being shown) of the output ring member, which, when engaged with either load bearing flange, allows transfer of rotational loads from the input shaft to the output ring member. Uniquely, this free compensating rotation, typically between approximately 7 to 14 degrees, provides the desirable "slack" in the drive system previously described.

Advantageously, the free compensating rotation, or "slack" of the mechanism, can be finely adjusted, as desired, by simply stacking adjustment shims 24 between the opposed bushing ends of compensator bushing member 14 and one or both of the first and second bearing flanges 12 and 18. Uniquely, this allows the drive system to be adjusted, as desired, to satisfy the shifting requirements or feel for any individual application, as may be desired. Also, where buffer members are employed, the adjustment of the axial travel of the output ring member can be accomplished by adjusting the thickness of the buffer members. Either or both adjustment means can be employed in one compensator, as desired.

Providing for the axial motion of a gear or sprocket carrying a chain is unconventional in the motorcycle art, and such movement was previously believed to adversely affect operation of the drive system. It was erroneously believed that such axial movement would result in abnormal wear of drive system components. However, according to the present invention, it has been found that allowing up to approximately ⅛ inches of axial movement of the output ring member does not adversely affect the operation of the system. Adding or removing adjustment shims 24, simply, reliably, and precisely controls the amount of such axial movement.

In the embodiment of FIG. 2, the engine compensator 10 further includes lossey shims or buffer members 36 that are placed between the load bearing flanges 12 and 18, and the opposed load transferring ends 34 of the output ring member. Use of lossey shims 36 further improves the absorption and dampening of rotational shock loads, particularly in high performance applications. Shims 36 made, for example, of nylon and having a thickness of about 0.060 inches have proven satisfactory in such applications, although other lossey materials, thicknesses and configurations may be used, as desired. Also shown in FIG. 2, the first load bearing flange 12 is integral with the compensator bushing member 14. This eliminates one part and therefor simplifies the compensator assembly. Compared to the prior art compensator which comprises nine separate parts, the embodiment shown in FIG. 2 comprises just four parts when the shims 36 are not used, or just six parts when the shims are used.

Figure 4:
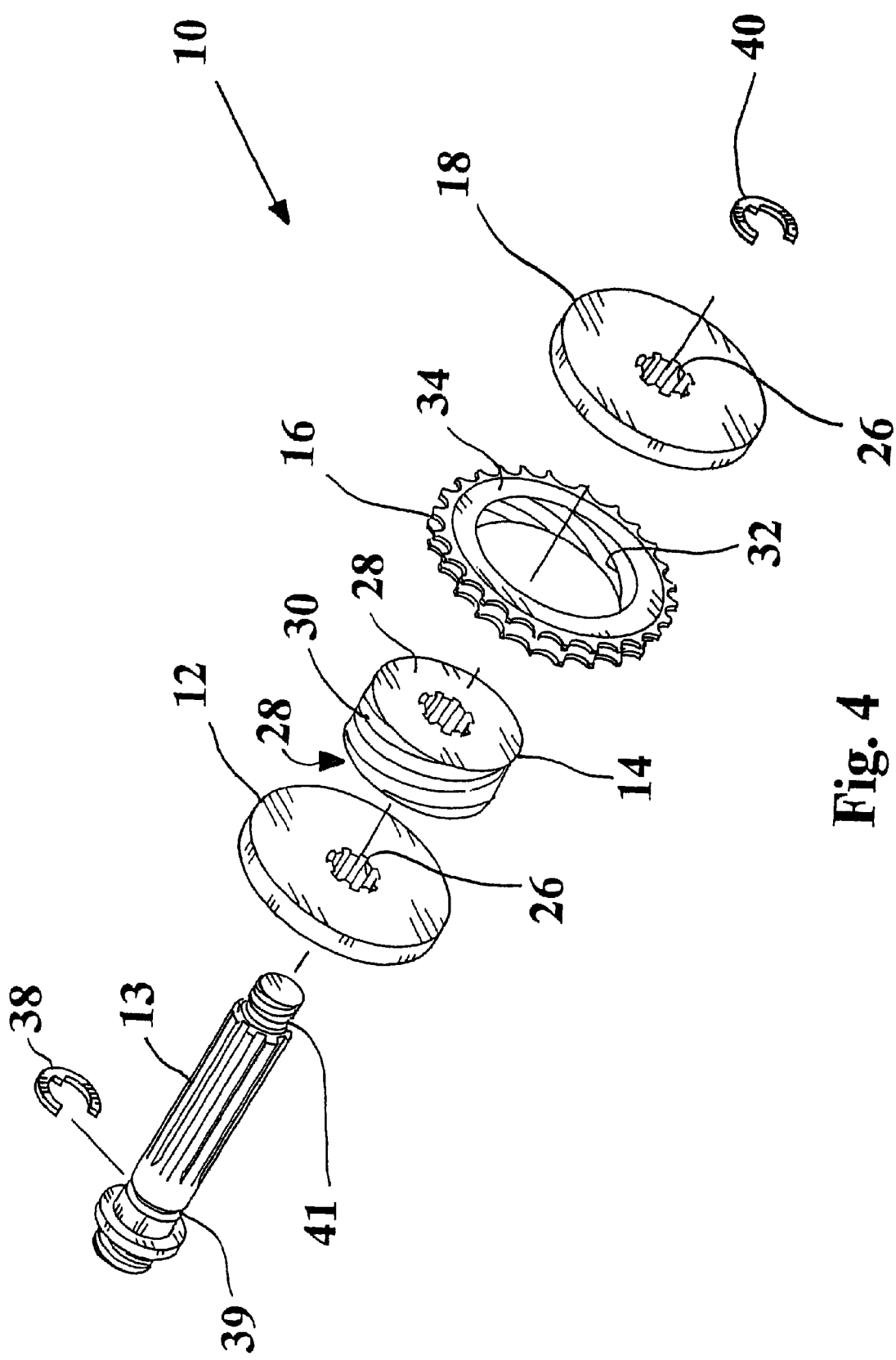
FIG. 4 is an exploded perspective view of another embodiment of the invention.

In the embodiment of FIG. 4, the engine compensator 10 is retained in the assembled configuration by snap rings 38 and 40. The stop means for the first load bearing flange 12 is provided by the engagement of snap ring 38 in groove 39. Once all the components have been placed on input shaft 13, snap ring 40 is engaged in groove 41 to complete the assembly. In this embodiment the load bearing flanges and compensator bushing member are not compressively engaged. Other methods of restraining the assembly while leaving the load bearing flanges and compensator bushing member non-compressively engaged, may be used, if desired. For example, in the embodiment of FIG. 2, shaft flange 43 of input shaft 13 could be used as the stop means for the first bearing flange 12, and mount nut 20 could stop on raised spline edge 45 and thereby leave the components non-compressively engaged.

Figure 5:
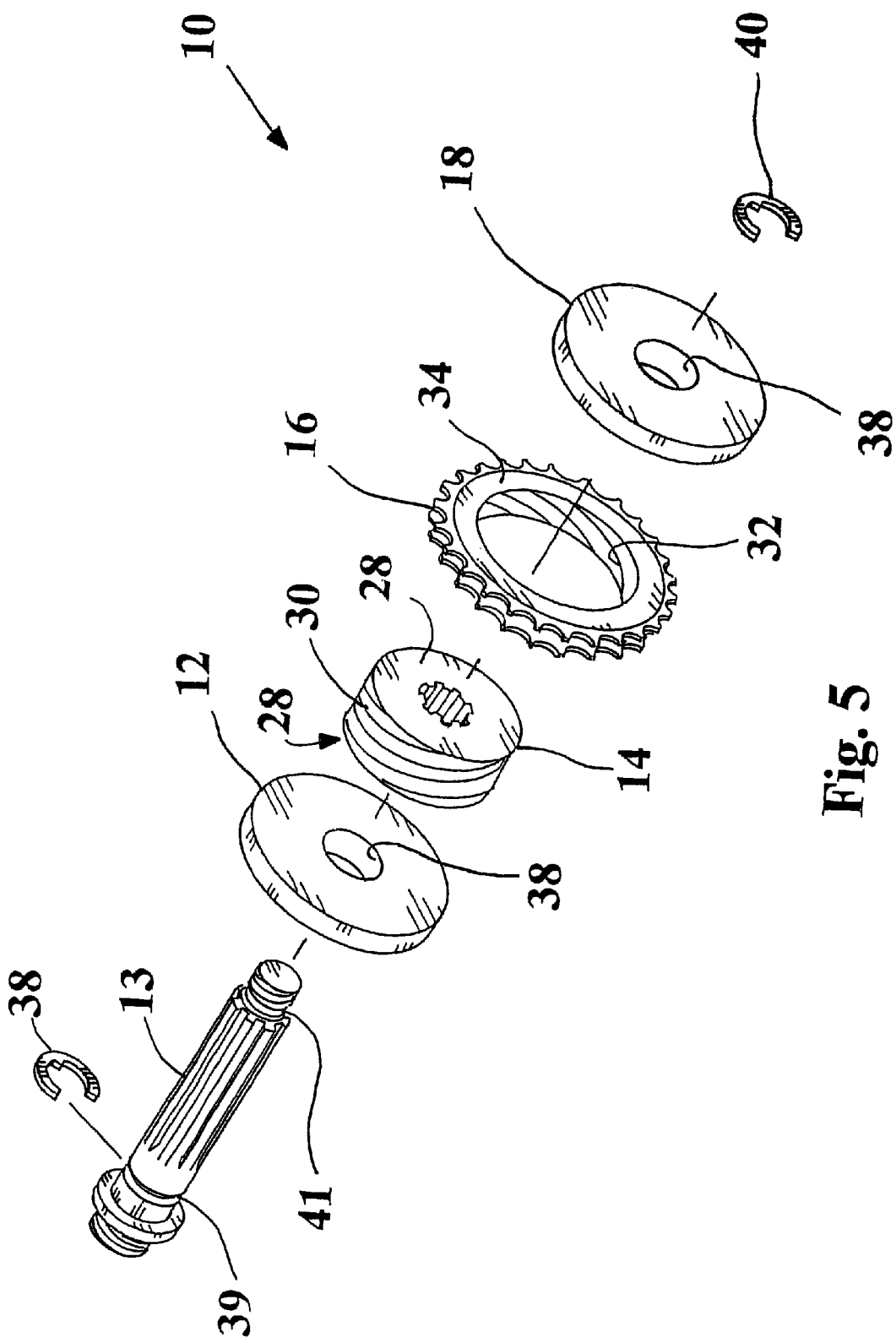
FIG. 5 is an exploded perspective view of another embodiment of the invention.

Shown in FIG. 5 is another alternative embodiment of the present invention. The engine compensator 10 in this embodiment is similar to the embodiment shown in FIG. 4, with the following difference. The first and second load bearing flanges, 12 and 18, rotably engage input shaft 13 via smooth mount bores 38. In, for example, FIG. 3, mating spline groves 26 are used to fixedly engage the load bearing flanges to the input shaft. One advantage of the rotatable engagement configuration of FIG. 5 is its simplicity and ease of manufacture. In addition, when the load bearing flanges are allowed to rotate on the shaft, the rotational inertia of the drive system is reduced even when loads are transmitted through the compensator because one of the flanges is always rotatably free. Thus, the rotable engagement configuration reduces the total combined rotational inertia of the drive system by the amount of one load bearing flange, but at the expense of introducing rotating parts that are subject to wear. Such a reduction is desirable in high performance applications but may not be desirable in long life or low maintenance applications. However, either the fixed engagement configuration or the rotable engagement configuration may be used, as desired. Various bearings such as, for example, thrust bearings can be used if desired to rotatbly mount the flanges to the input shaft.

Any one of the embodiments discussed above may be used to replace the prior art, 6 lbs ⅛ oz., spring compensator. The embodiment of FIG. 2 has been adapted to replace the prior art spring compensator and advantageously weighs just 3 lbs ⅜ oz. This is a substantial weight reduction and, with the elimination of unnecessary parts and lower profile, the rotational inertia of the compensator is also substantially reduced. This advantageously reduces the overall rotational inertia of the drive system, which is very desirable in high performance applications. In addition, the axially moving compensator is capable of consistently and reliably absorbing rotational shock loads of 130 ft-lbs. and greater produced from high performance engines often having power ratings of 100 horsepower or greater. Such compensator performance was unobtainable with the prior art compensator.

In the embodiments shown in the drawings, for purposes of illustration, the output ring member is shown having two rows of gear teeth 42 for delivery of rotational loads via a chain. This is a common delivery method in motorcycle applications, however, other methods may be employed, if desired, such as, belts, gears, and the like, without departing from the spirit and scope of the accompanying claims.

What have been described are preferred embodiments in which modifications and changes may be made without departing from the spirit and scope of the accompanying claims.

Obviously many modifications and variations of the present invention are possible in light of the above teachings. It is therefore to be understood that, within the scope of the appended claims, the invention may be practiced otherwise than as specifically described.

What is claimed is:

1. A compensator adapted to absorb shock loads and transmit rotational loads between an input shaft and an output ring member, said compensator comprising:
    an externally threaded compensator bushing member operably engaging said input shaft in a load transferring relationship, said compensator bushing member having opposed bushing ends;
    said output ring member having an internal thread, said internal thread threadably engaging said compensator bushing member so as to simultaneously compensatingly rotate and move axially about said compensator bushing member, said output ring member having opposed load transferring ends;
    a first load bearing flange engaging said input shaft adjacent one of said opposed bushing ends;
    a second load bearing flange engaging said input shaft adjacent the other of said opposed bushing ends;
    wherein said load bearing flanges captively limit the axial movement and rotation of said output ring member, and thereby establish transfer of said rotational loads between said input shaft and said output ring member whenever a said load transferring end is biased against a said load bearing flange.

2. A compensator of claim 1 wherein said load bearing flanges and said compensator bushing member are compressively engaged on said input shaft.

3. A compensator of claim 1 wherein the amount of said axial movement of said output ring member on said compensator bushing member is adjustable.

4. A compensator of claim 1 wherein said first compensator load bearing flange is integral with said compensator bushing member.

5. A compensator of claim 1 further comprising at least one shock dampening shim between a said load transferring end of said output ring member and a said load bearing flange.

6. A compensator of claim 1 wherein said compensator is specially adapted to being mounted to a motorcycle and can reliably absorb rotational shock loads of at least 130 ft-lbs. and weighs less than 6 lbs.

7. A compensator of claim 1 wherein said compensator bushing member and said output ring member are threadably engaged in order to simultaneously compensatingly rotate and axially move.

8. A compensator of claim 7 wherein external helix screw threads are provided on said compensator bushing member and mating internal helix screw threads are provided on said output ring member wherein threadable engagement of said internal and external helix screw threads provides said simultaneous compensating rotation and axial movement of said output ring member.

9. A compensator of claim 8 wherein at least four complete helix screw threads are provided on both said compensator bushing member and said output ring member.

10. A high performance axially moving engine compensator adapted to reliably absorb rotational shock loads of at least 130 ft-lbs and transmit rotational loads between an input shaft and output ring member, said compensator comprising:
    a compensator bushing member engaging said input shaft in a load transferring relationship, said compensator bushing member having a bushing end on one side and a first load bearing flange end on the opposite side;

said output ring member threadably engaging said compensator bushing member so as to simultaneously compensatingly rotate about and axially move relative to said compensator bushing member, said output ring member having opposed load transferring ends; and a second load bearing flange separate from said compensator bushing member, said second load bearing flange engaging said input shaft adjacent said bushing end; said first and second load bearing flanges captively limiting said axial movement and axial rotation of said output ring member.

11. A high performance axially moving engine compensator of claim 10 wherein said second load bearing flange and said compensator bushing member are compressively engaged on said shaft.

12. A high performance axially moving engine compensator of claim 11 wherein the amount of said axial movement of said output ring member on said compensator bushing member is adjustable.

13. A high performance axially moving engine compensator of claim 11 further comprising at least one buffer member between a said load transferring end of said output ring member and a said load bearing flange.

14. A high performance axially moving engine compensator of claim 13 wherein said buffer member is made of nylon.

15. A high performance axially moving engine compensator of claim 10 wherein external helix screw threads are provided on said compensator bushing member and mating internal helix screw threads are provided on said output ring member wherein threadable engagement of said internal and external helix screw threads provides said simultaneous compensating rotation and axial movement of said output ring member.

16. A high performance axially moving engine compensator of claim 15 wherein at least four complete helix screw threads are provided on both said compensator bushing member and said output ring member.

17. A high performance axially moving engine compensator of claim 16 adapted for use on motorcycle engines producing more than about 40 horsepower.

18. A compensator device that is adapted to being mounted on an input shaft to absorb rotational shock loads comprising:

a first stop member mounted to said input shaft, said input shaft having a longitudinal axis;

a second stop member mounted to said input shaft, said second stop member being spaced from said first stop member by a first axial distance;

an external thread in generally fixed concentric association with said input shaft, said external thread extending substantially between said first and second stop members;

an internally threaded output ring member threadably mounted on said external thread, said output ring member having an axial thickness along said longitudinal axis that is less than said first axial distance.

19. A compensator device of claim 18 wherein said external thread is on a compensator bushing member, said compensator bushing member being fixedly mounted to said input shaft.

20. A compensator device of claim 18 including a buffer member positioned between at least one of said first or second stop members and said output ring member.

21. A compensator device of claim 18 wherein at least one of said stop members is journaled for rotation about said longitudinal axis.

* * * * *